June 11, 1940.    J. H. MELVILLE    2,204,046
PEN LIFTING ATTACHMENT FOR RECORDING METERS
Filed April 28, 1939
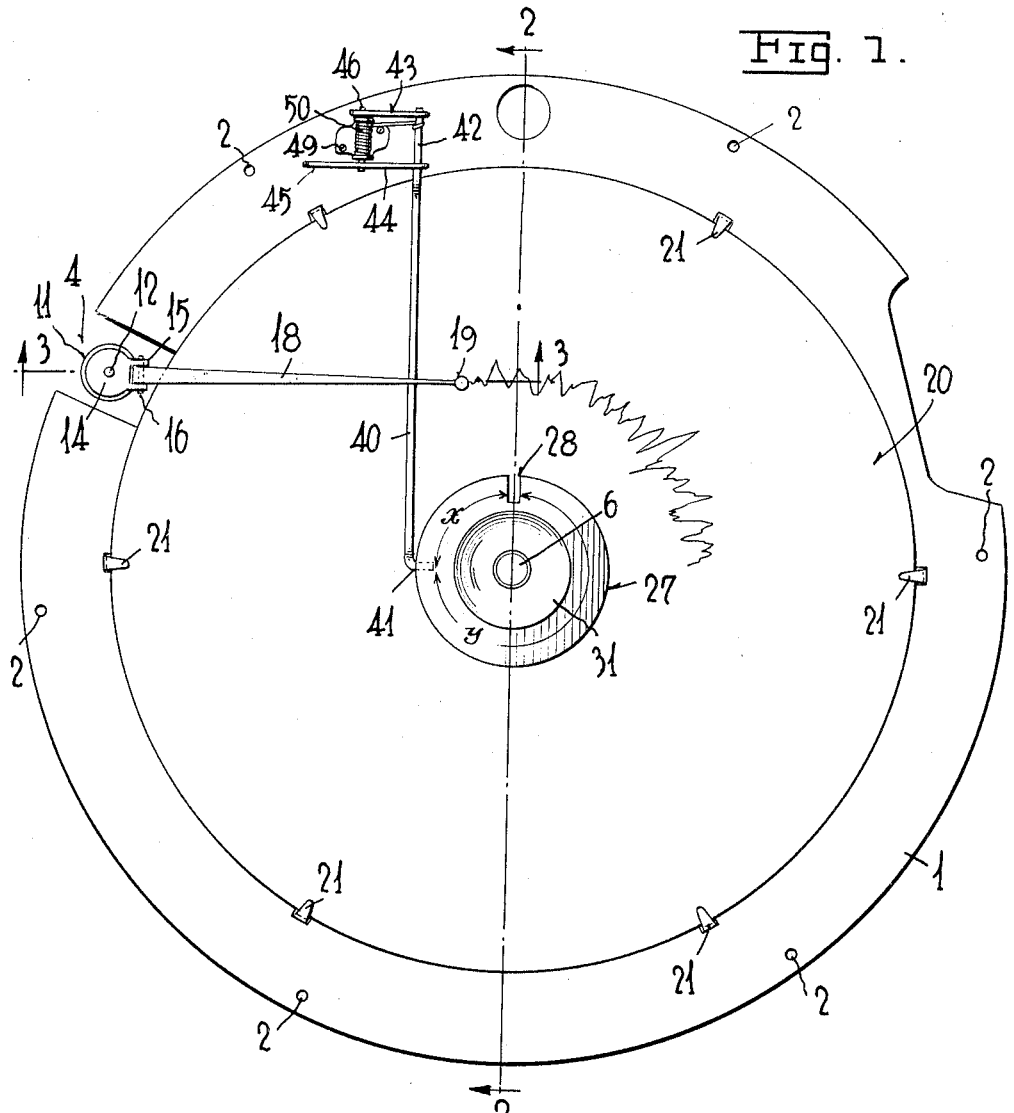
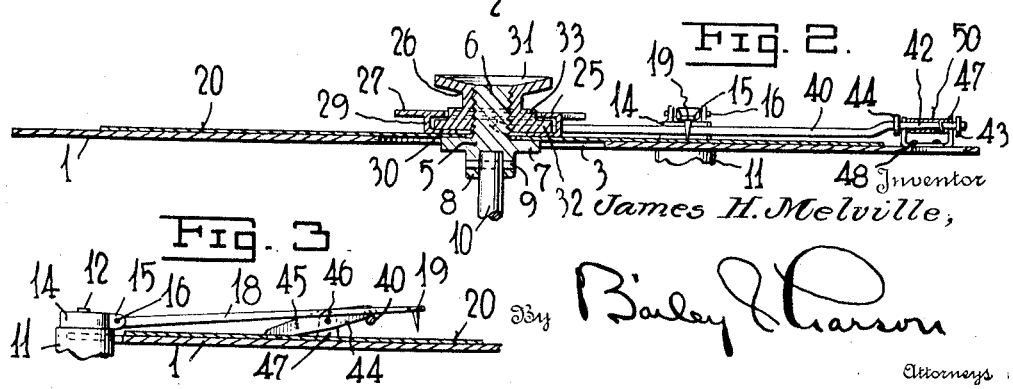
Inventor
James H. Melville,
By Bailey & Carson
Attorneys

Patented June 11, 1940

2,204,046

UNITED STATES PATENT OFFICE 2,204,046

PEN LIFTING ATTACHMENT FOR RECORDING METERS

James H. Melville, Miami, Fla.

Application April 28, 1939, Serial No. 270,676

8 Claims. (Cl. 234—72)

This invention relates to recording meters and to such meters which are adapted for recording variations in pressure, temperature, rate of flow, gas analysis and, particularly, variable electrical quantities.

It is an object of this invention to provide means adapted automatically to prevent overrunning of the pen or writing point of a recording instrument past a predetermined portion of the recording chart or element in such a recording device.

It is a further object of this invention to provide such means which is particularly adapted for ease of attachment to such recording instruments of known, conventional, form.

It is a further object of this invention to provide such means which may be readily attached to such recording instruments and which, when operated, will in nowise affect or modify the normal function of the operative parts of the instrument between predetermined limits of time.

It is a further object of this invention to provide such means which may be readily adjusted for controlling the recording function of the instrument for varying the period of time through which the recording function shall be performed thereby.

It is a further object of this invention to provide in such means a unit adapted for substitution for the conventional chart-fastening nut of conventional rotary recording meters which, in addition to performing the chart-fastening function, is adapted also to cooperate with means controlling the lifting of the writing point of the meter at predetermined intervals.

It is a further object of this invention to provide such means which is particularly adapted for manual adjustment of the constituent parts thereof for predeterminedly adjusting the period through which the writing point of the recording instrument shall be operative.

These and other objects and advantages will appear from the following description taken in connection with the drawing.

In the drawing:

Fig. 1 is a plan view of apparatus constructed according to this invention as applied to the chart-supporting plate of a known type of recording meter, the meter case and associated parts being removed in the interest of clearness of disclosure;

Fig. 2 is a section taken on the line 2—2 of Fig. 1; and

Fig. 3 is a fragmentary view in section taken substantially on the line 3—3 of Fig. 1 but showing the pen-lifting device in operation whereby the writing point is lifted from the chart.

Referring to the drawing in detail, and with reference particularly to Figs. 1 and 2, the chart-supporting plate is designated 1 and is provided with spaced apertures 2 which are adapted to receive screws, bolts or the like for attachment to suitable means provided in the instrument case (not shown). The chart-supporting plate is provided with a central aperture 3 through which extends upwardly a chart holder or chart-holding element 5 which comprises an upper threaded screw portion 6, a flange 7 adapted to support the central portion of a recording chart and a downwardly depending cylindrical flange portion 8 which is adapted for close engagement with the upper end of a clock spindle 10 and which is secured thereto by means of a pin 9 extending through suitable aligned bores or apertures provided in the flange portion 8 and the clock spindle 10. The chart-supporting plate 1 is provided also with a marginal aperture 4 through which extends upwardly the shaft 12 of a metering element 11. The metering element 11 is responsive to variation of the quantity or quantities to be measured, such as pressure, temperature, etc., and upon limited turning movement thereof has like movement imparted thereto. Rigidly secured to the shaft 12 is a hinge element 14 which is provided with a pair of spaced parallel ears 15, which ears are provided with a suitable apertures for receiving the hinge pin 16 by means of which the arm member 18 (hereinafter termed the pen arm) is hinged to the hinge element 14. At its free end, the arm member 18 is provided with suitable known writing point means 19 which, as shown, is in the form of a pen, but which may comprise a pencil lead or metallic point of known form. Suitable means may be provided for urging the writing point toward the chart thereof; in certain cases, the weight of the writing point will be sufficient to maintain it in contact with the recording chart. All the above described structure is conventional and comprises only one form of recording meter structure to which the apparatus of this invention is adapted for attachment.

The recording chart is designated 20 and is in the form of a paper disc which may be provided with any suitable indicia or other quantitative graduations to facilitate the taking of the desired readings from the chart. The chart is clamped to the chart holder by means and in a manner hereinafter most clearly described in order that it may be rotated by rotation of the chart holder through rotation of the clock spindle. In order to provide means for guiding the marginal portions of the chart 20 during its rotation, a plurality of ears 21 are struck up from the chart-supporting plate 1 in suitable locations to perform this function.

The combined means for controlling the period of time through which the writing point shall be effective and also for securing the record chart 20 to the chart holder 5 in such manner that it may rotate therewith comprises the member 25 and associated nut 26. The member 25 comprises a forward annular flange 27 provided with a radial slot 28, which flange and slot operate as hereinafter described to maintain the pen-lifting member inoperative during periods when it is desired that the writing point shall be in contact with the chart 20. Extending rearwardly of the flange 27 is a cylindrical wall 29 which terminates rearwardly in the annular wall 30. The annular wall 30 is adapted for direct engagement with the chart 20, and when tightly engaged therewith the chart 20 is clamped between the annular wall 30 and the flange 7 of the chart holder 5. As will be clearly seen in Fig. 2, an annular chamber is formed about the screw threaded portion 6 of the chart holder 5 within the cylindrical wall 29 and between the forward flange 27 and annular wall 30 of the member 25. The nut member 26 is provided forwardly with a manually engageable flange or head 31, which is preferably knurled or otherwise roughened at its periphery. Offset rearwardly from the flange or head 31 is a stepped flange having the enlarged rearward portion 32 thereof disposed within the above described chamber formed by the flange 27, the cylindrical wall 29 and the annular wall 30. The smaller, forward portion 33 of the stepped flange is adapted loosely to engage a central aperture provided in the flange 27 in such manner as to prevent substantial, objectionable, misalignment of the member 25 with respect to the nut member 26 and the chart holder 5. The nut member 26 is provided with screw threads which are complementary to the screws threads of the screw portion 6 of the chart holder 5. In order that a chart shall be operatively secured to the chart holder 5, it is placed over the chart-supporting plate 1 with its edge portions disposed beneath the ears 21 and thus aligned. Thereafter the nut 26 with its attached member 25 is screw-threadedly attached to the portion 6 of the chart holder 5, and it is then screwed tightly downwardly, as seen in Fig. 2, in such manner that the annular wall 30 and flange 7 of the chart holder 5 clamp the central portion of the chart 20 therebetween. The central portion of the chart 20 is thus secured to and supported by the chart holder 5 while portions thereof which are further outwardly disposed than the central aperture 3 in the plate 1 are slidably supported by the plate 1 and guided by the above described ears 21 thereof.

The pen-lifting means comprises the lifting arm 40 which has an intermediate, substantially straight, portion which terminates inwardly in an upwardly or forwardly offset finger 41, which is disposed substantially at right angles to the axis of the intermediate straight portion of the lifting arm. At its other end, the lifting arm 40 is provided with an upwardly offset straight portion 42 which has rigidly secured thereto in spaced relationship a pair of lever members 43 and 44, the latter of which is substantially longer than the other and the free end of which cooperates with the adjacent portion of plate 1 to limit pivotal movement of the lever member 44 in one direction. This latter end portion, which may be properly termed stop means on the lever 44, is designated 45. By means of their rigid attachment, in spaced relationship, to the portion 42 of the lifting arm 40 the lever members 43 and 44 are maintained, rigidly, in parallelism. They are supported for limited pivotal movement by the pin member 46 upon which they are pivotally supported. The pin member 46 is supported by a pair of parallel upstanding ear members 47 which are integral with the bracket member 48. The bracket member 48 is rigidly secured to the plate 1 by means of screws 49. In order that the lifting arm 40 shall be constantly biased forwardly of or outwardly from the plate 1 and supported record chart 20, a coil spring member 50 is disposed between the ears 47 of the bracket 48 with one end thereof secured to the inner ear 47 and the other end thereof secured to the portion 42 of the lifting arm 40, as shown in Fig. 1. This spring 50 thus comprises biasing means for constantly biasing the lifting arm 40 and its finger 41 outwardly of the record chart 20.

As shown in Fig. 1, the intermediate portion of the lifting arm 40 is disposed beneath the pen arm 18 or between the pen arm 18 and the chart 20. When the finger 41 is disposed beneath the forward flange 27 of the member 25 as shown in Fig. 1, the lifting arm 40 is maintained out of engagement with the pen arm 18 in such manner that the writing point 19 thereof will be in normal engagement with the record chart whereupon rotation of the clock spindle 10 and attached chart holder 5 will cause the chart 20 to be rotated beneath the writing point 19 in such manner that the record will be placed upon the chart 20 by the writing point 19 in known manner.

In order to set the lifting arm 40 at the beginning of an operative cycle of the instrument, the lifting arm 40 is manually depressed and the finger 41 thereof inserted through the slot 28 in the forward flange 27 of the member 25. The member 25 is then moved in clockwise direction (as seen in Fig. 1) sufficiently to engage the inner surface of the forward flange 27 with the finger 41. At this time, the lifting arm 40 will be maintained out of engagement with the pen arm 18 in such manner as to interfere in nowise with the normal operation thereof.

Thereafter, rotation of the chart 20 and chart holder 5 will be accomplished by the clock spindle 10 until sufficient rotation of the clock holder 5 occurs to align again the finger 41 with the slot 27. When such alignment occurs, the biasing action of the spring 50 will be effective to swing the lifting arm 40 outwardly or away from the chart 20 until the stop means 45 on the lever member 44 will engage the plate 1, as shown in Fig. 3. The pen arm 18 is then lifted as shown in Fig. 3 and further rotation of the chart with the chart holder 5 will occur without further operation of the writing point 19. After release of the lifting arm 40 as above described, the finger 41 thereof will remain above or outwardly of the forward flange 27 of the member 25 in such manner that engagement of the writing point 19 with the chart 20 will be totally prevented.

Fig. 1 shows the position of the parts wherein a partial cycle of operation has occurred. As therein shown, the chart and chart support 5 have been rotated through an angle designated $x$ since the lifting arm 40 was set in inoperative position. Thereafter, as soon as the rotation will continue through the further angle $y$ the finger 41 will register with the slot 28 and release of the lifting arm 40 will occur, whereby, under the influence of the biasing means or spring 50, the lifting arm will swing outwardly to the position shown in Fig. 3 and the writing point will be removed from the chart in such manner that the record placed upon the chart 20 by the writing point 19 will not overlap and thus form on the chart 20 a record which would be confusing.

The members 25 and 26 are freely rotatable with respect to one another until the nut member 26 is screwed tightly down upon the portion 6 of the chart holder, whereupon relative rotation thereof will be prevented because of the frictional engagement of the interior of the annular wall 30 with the inner annular wall of the portion 32 of the stepped flange.

If it is desired that the record will be taken for a period of time which is less than that period requiring a full rotation of the chart 20, a preliminary partial rotation of the member 25 with respect to the nut member 26 may be manually accomplished. When this is done, the period through which the recording operation will occur will be represented by the further annular rotation necessary to realign the finger 41 and slot 28.

I claim:

1. In a recording meter having a pen-arm movable in response to variations in measured quantities and chart-supporting and driving means for moving a chart with respect to said pen-arm at a predetermined rate, a pen-arm lifting means constantly biased toward pen-arm lifting position, and retaining means responsive to movement of said chart-driving means for maintaining said pen-arm lifting means inoperative during predetermined movement of said chart, and thereafter releasing the same for operation.

2. In a recording meter having a pen-arm movable in response to variations in measured quantities and chart-supporting and driving means for moving a chart with respect to said pen-arm at a predetermined rate, a pen-arm lifting means constantly biased toward pen-arm lifting position, and retaining means responsive to movement of said chart driving means for maintaining said pen-arm lifting means inoperative during predetermined movement of said chart-driving means and thereafter releasing the same for operation, said retaining means being adjustable with respect to said chart-driving means for adjusting the period of inoperativeness of said pen-arm lifting means.

3. In a recording meter having a pen-arm movable in response to variations in measured quantities and chart-supporting and driving means for moving a chart with respect to said pen-arm at a predetermined rate, pen-arm lifting means constantly biased toward pen-arm lifting position, and retaining means responsive to movement of said chart-driving means for maintaining said pen-arm lifting means inoperative during predetermined movement of said chart-driving means, said retaining means cooperating with said chart-supporting means for clamping the chart to said chart-supporting and driving means for movement of the chart by said chart-supporting and driving means.

4. In a recording meter having a pen supporting arm movable in response to variations in measured quantities and chart-supporting and driving means for moving a chart with respect to said writing point at a predetermined rate, lifting arm means disposed between said pen-arm and said chart and resiliently biased away from said chart, and means movable with said chart driving means for retaining said lifting arm means against outward movement with respect to said chart during predetermined movement of said chart with respect to said pen-arm and for thereafter releasing said lifting arm means for movement in the plane perpendicularly of said chart to lift said pen-arm and remove said writing point from contact with said moving chart.

5. In a recording meter having a pen-supporting arm movable in response to variations in measured quantities, and a rotary flanged chart-supporting and moving means driven at a predetermined rate, said flange having a slot, a nut member screwthreadedly attached to said chart-supporting means, a member enclosing and frictionally engaging a portion of said nut member, said member having a rear wall cooperating with the flange on said chart-supporting means for clamping a chart thereto and having a lifting arm finger-retaining flange thereon, and a lifting arm disposed between said chart and said pen-arm and resiliently biased outwardly of said chart, said lifting arm having an end finger insertable through said slot for retention by said retaining flange until thereafter the slot in said retaining flange is again aligned with the finger upon further rotation of said chart-moving means.

6. In a recording meter having a pen-supporting arm movable in response to variations in measured quantities, and a rotary flanged chart-supporting and driving means driven at a predetermined rate, in combination with means including a slotted lifting arm finger-retaining flange rotatable with said chart-supporting means, a bracket fixed to a fixed portion of said meter, a pivot pin supported by said bracket and disposed substantially perpendicular to said pen-arm, a pair of lever members pivotally supported by said pivot pin, a lifting arm fixed to one end of each of said lever members and extending perpendicularly to said pen-arm, and spring means on said pivot pin for normally biasing said lifting arm outwardly of said chart, said lifting arm having a finger at its free end and capable of alignment with the slot in said retaining flange, said finger being adapted for retention beneath said retaining flange during operation of said meter for a predetermined period of time, and being adapted for projection upwardly through said slot upon alignment therewith to release said lifting arm for lifting said pen-arm.

7. In a recording meter having a pen-arm movable in response to variations in measured quantities, and a rotary flanged chart-supporting and driving means driven at a predetermined rate, in combination with means including a slotted flange rotatable with said chart-supporting means, a bracket fixed to a fixed portion of the meter, a pivot pin supported by said bracket and disposed substantially perpendicular to said pen-arm, a pair of lever members pivotally supported by said pivot pin, a lifting arm fixed to one end of each of said lever members, the opposite end of one of said lever members extending substantially beyond said pivot pin and forming stop means cooperating with said chart-supporting plate to limit outward movement of the lifting arm-supporting ends of said lever members, and spring means on said pivot pin for normally biasing said lifting arm to move in a plane perpendicular to said chart, said lifting arm having a finger at its free end projecting toward said chart-supporting means and capable of alignment with the slot in said retaining flange, said finger being adapted for retention beneath said retaining flange during operation of said meter for a predetermined period of time, and being adapted for projection upwardly through said slot upon alignment therewith to release said lifting arm for lifting said pen-arm.

8. In a recording instrument including a hub rotatable in accordance with one factor, a recording pen movable in accordance with another factor, and a pen-lifter normally biased to move said pen towards an inoperative position, the combination of a member rotatable on said hub, retaining means on said member engageable with said pen-lifter to hold said pen-lifter in inoperative position, said retaining means being configurated to release said pen-lifter upon rotation of said retaining means, and means for holding said member relative to said hub in any one of a plurality of angular positions.

JAMES H. MELVILLE.